(12) United States Patent
Tzeng et al.

(10) Patent No.: US 11,131,582 B2
(45) Date of Patent: Sep. 28, 2021

(54) OPTICAL SENSING CIRCUIT, DISPLAY PANEL AND DISPLAY SENSING PANEL

(71) Applicant: AU OPTRONICS CORPORATION, Hsin-Chu (TW)

(72) Inventors: Bo-Shiang Tzeng, Hsin-Chu (TW); Ching-Lang Hung, Hsin-Chu (TW); Chia-Wei Kuo, Hsin-Chu (TW); Chiao-Chen Yu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 47 days.

(21) Appl. No.: 16/844,195

(22) Filed: Apr. 9, 2020

(65) Prior Publication Data

US 2020/0326234 A1 Oct. 15, 2020

(30) Foreign Application Priority Data

Apr. 10, 2019 (TW) ................. 108112550

(51) Int. Cl.
*G01J 1/44* (2006.01)
*G01J 1/02* (2006.01)
*G01J 1/42* (2006.01)

(52) U.S. Cl.
CPC ............... *G01J 1/44* (2013.01); *G01J 1/0295* (2013.01); *G01J 1/4228* (2013.01); *G01J 2001/444* (2013.01)

(58) Field of Classification Search
CPC .......... G01J 1/44; G01J 1/0295; G01J 1/4228; G01J 2001/444; G01J 1/0488; G01J 2001/4473; G06F 3/042; G06F 3/04186; G06F 3/0412; G06F 3/0416
See application file for complete search history.

(56) References Cited

U.S. PATENT DOCUMENTS

| 5,130,776 A | 7/1992 | Popovic et al. |
| 6,201,234 B1 | 3/2001 | Chow et al. |
| 2016/0020337 A1* | 1/2016 | Yu .............................. G01J 1/44 250/226 |
| 2017/0276541 A1* | 9/2017 | Lin .......................... G06F 3/042 |

* cited by examiner

*Primary Examiner* — Thanh Luu
*Assistant Examiner* — Monica T Taba
(74) *Attorney, Agent, or Firm* — WPAT, PC

(57) ABSTRACT

An optical sensing circuit includes a first, a second, and a third optical sensing element and a sampling circuit. The first sensing element provides a first current from a first node to a second node according to an ambient light and a sensing signal. The second optical sensing element drains a second current from the second node to the first node according to the ambient light and the sensing signal. The third optical sensing element is coupled between the first node and the second node. The third optical sensing element receives a first color light, and transmits the first current to the second node or transmits the second current to the first node according to the first color light. The sampling circuit is turned on according to the sampling signal to output a detection signal based on the voltage level of the second node.

20 Claims, 5 Drawing Sheets

OPTICAL SENSING CIRCUIT, DISPLAY PANEL AND DISPLAY SENSING PANEL

CROSS-REFERENCE TO RELATED APPLICATION

This application claims priority to Taiwan Application Serial Number 108112550, filed Apr. 10, 2019, which is herein incorporated by reference in its entirety.

BACKGROUND

An optical sensing circuit is configured to output different results according to detected color light. Since a brightness of an ambient light is unable to be controlled, and the ambient light of the high brightness may mistakenly trigger the optical sensing circuit, resulting in a low detection accuracy of the optical sensing circuit.

SUMMARY

In order to solve the above issue, in an embodiment of the present disclosure, an optical sensing circuit includes a first optical sensing element, a second optical sensing element, a third optical sensing element, and a sampling circuit. The first optical sensing element is configured to provide a first current from a first node to a second node in response to the ambient light and a sensing signal during a sensing period, to raise a voltage level of the second node. The second optical sensing element is coupled in parallel to the first optical sensing element and configured to draw a second current from the second node to the first node during an initialization period in response to the ambient light and the sensing signal, to lower the voltage level of the second node. The third optical sensing element is coupled between the first node and the second node, wherein the third optical sensing element is covered by a first filter element to receive a first color light and configured to, according to the first color light, transmit the first current to the second node or transmit the second current to the first node. The sampling circuit is configured to be turned on, according to a sampling signal, to output a detection signal based on the voltage level of the second node.

In an embodiment of the present disclosure, a display panel includes pixel array, first sensing elements, and second element, wherein pixel of pixel array includes the optical sensing circuit and the optical sensing circuit includes: a first transistor and a second transistor. The first transistor is coupled to a power source and the second transistor, and being turned on according to the second node. The second transistor is coupled to the first transistor and configured to be turned on to output voltage from the power source as the detection signal according to the sampling signal.

In summary, the optical sensing circuit and the display panel in the embodiments of the present disclosure can lower the interference of the ambient light, reduce a chance of the optical sensing circuit being triggered mistakenly, and increase an opening rate of a display area and a sensing speed of a sensing zone.

BRIEF DESCRIPTION OF THE DRAWINGS

The disclosure can be more fully understood by reading the following detailed description of various embodiments, with reference to the accompanying drawings as follows.

DETAILED DESCRIPTION

It will be understood that in the present disclosure, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

Figure 1A:
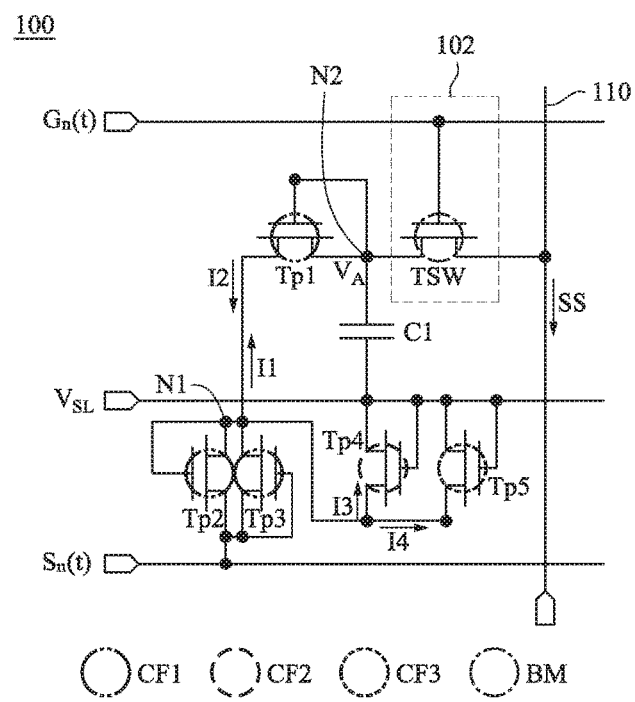
FIG. 1A is a schematic diagram of the optical sensing circuit, in accordance with some embodiments of the present disclosure.

Referring to FIG. 1A, FIG. 1A is a schematic diagram of the optical sensing circuit 100 illustrated in accordance with some embodiments in the present disclosure. The optical sensing circuit 100 includes a first optical sensing element Tp3, a second optical sensing element Tp2, a third optical sensing element Tp1, and a sampling circuit 102. The first optical sensing element Tp3 is configured to provide the first current I1 from a first node N1 to a second node N2 in response to the ambient light and the sensing signal $S_n(t)$ during the sensing period 130 described later in FIG. 1B, to raise the voltage $V_A$ of the second node N2.

In some embodiments, the second optical sensing element Tp2 is coupled in parallel to the first optical sensing element Tp3 and configured to draw the second current I2 from the second node N2 to the first node N1 in response to the ambient light and the sensing signal $S_n(t)$ during the initialization period described later in FIG. 1B, to lower the voltage $V_A$ of the second node N2.

In some embodiments, the third optical sensing element Tp1 is coupled between the first node N1 and the second node N2, in which the third optical sensing element Tp1 is covered by a first filter element CF1 to receive the first color light and configured, according to the first color light, to transmit the first current I1 to the second node N2 or transmit the second current I2 to the first node N1.

In some embodiments, the sampling circuit 102 is configured to be turned on, according to the sampling signal $G_n(t)$, to output the detection signal SS based on the voltage $V_A$ of the second node N2 to the sensing line 110.

In some embodiments, the first optical sensing element Tp3, the second optical sensing element Tp2, and the third optical sensing element Tp1 are covered by the first filter element CF1. The first filter element CF1 is configured to pass the first color light. In this configuration, the first optical sensing element Tp3 is configured to generate the first current I1 according to the first color light and the sensing signal $S_n(t)$. The second optical sensing element Tp2 is configured to generate the second current I2 according to the first color light and the sensing signal $S_n(t)$.

In some embodiments, the first color light can be red light, and its wavelength ranges between approximately 620 and 750 nm. By this configuration, compared to other color light having the wavelength outside this wavelength range, red light is easier to pass the first filter element CF1. By disposing the first optical sensing element Tp3, the voltage $V_A$ can be raised in response to the first current I1. As a result, the change of the voltage $V_A$ can reflect better whether the optical sensing circuit 100 receives the first color light. In other words, by disposing the first optical sensing element Tp3, the sensitivity and/or the detection speed of the optical sensing circuit 100 detecting the first color light can be raised.

In some embodiments, the optical sensing circuit 100 further includes a capacitor C1. One end of the capacitor C1 is coupled to the second node N2, the other end of the capacitor C1 receives a voltage $V_{SL}$. The capacitor is charged through the first current I1 to raise the voltage $V_A$ of the second node N2, or is discharged through the second current I2 to lower the voltage $V_A$ of the second node N2.

In some embodiments, if the optical sensing circuit 100 is configured as a charging optical sensing circuit, the voltage $V_{SL}$ can be a low voltage. In some other embodiments, if the optical sensing circuit 100 is configured as a discharging optical sensing circuit, the voltage $V_{SL}$ can be changed to a high voltage.

In some embodiments, the optical sensing circuit 100 further includes a fourth optical sensing element Tp4 and a fifth optical sensing element Tp5. One end of the fourth optical sensing element Tp4 is coupled to the first node N1, and the other end of the fourth optical sensing element Tp4 receives the voltage $V_{SL}$. The fourth optical sensing element Tp4 is covered by a second filter element CF2 to receive a second color light and generate a third current I3, according to the second color light, to shunt the first current I1 in order to lower the voltage $V_A$ of the second node N2. One end of the fifth optical sensing element Tp5 is coupled to the first node N1, and the other end of the fifth optical sensing element Tp5 receives the voltage $V_{SL}$. The fifth optical sensing element Tp5 is covered by a third filter element CF3 to receive a third color light and generate a fourth current I4, according the third color light, to shunt the first current I1 in order to lower the voltage $V_A$ of the second node N2.

In some embodiments, the second light can be green light, and its wavelength ranges between approximately 495 and 570 nm. By this configuration, compared to other color light having the wavelength outside this wavelength range, green light is easier to pass the second filter element CF2.

In some embodiments, the third light can be blue light and its wavelength ranges between approximately 450 and 495 nm. By this configuration, compared to other color light having the wavelength outside this wavelength range, blue light is easier to pass the third filter element CF3.

In some embodiments, by disposing the first filter element CF1 to the third filter element CF3, the first optical sensing element Tp3 to the fifth optical sensing element Tp5 can sense the color light of specific wavelength range. In some embodiments, the fourth optical sensing element Tp4 and fifth optical sensing element Tp5 are disposed to absorb unnecessary light and to reduce the interference of the ambient light. In other words, the fourth optical sensing element Tp4 and the fifth optical sensing element Tp5 can convert the unnecessary ambient light (for example the second color light and the third color light in the ambient light) into current, to reduce the voltage $V_A$ of the second node N2. As a result, the touch panel using the optical sensing circuit 100 can be applied to reduce the interference generated from the ambient light, to improve the sensing accuracy.

In some embodiments, the sampling circuit 102 includes a transistor TSW. The transistor TSW is configured to be turned on according to the sampling signal $G_n(t)$ and configured to output the detection signal SS based on the voltage $V_A$ of the second node N2. In some embodiments, the transistor TSW is covered by a black matrix BM.

In some embodiments, the first optical sensing element Tp3 to the fifth optical sensing element Tp5 and the transistor TSW can be implemented by either bipolar transistor (BJT), field effect transistor (FET) and/or thin-film transistor (TFT). In this embodiment, the first optical sensing element Tp3 to the fifth optical sensing element Tp5 are each implemented for example by an n-type TFT, but the present disclosure is not limited thereto. Depending on various applications, each optical sensing element in the present disclosure is implemented by various types of transistors. When a control end (e.g., gate) of each transistor receives a non-conducting signal (e.g., the low voltage $V_{SL}$), the voltage difference (gate-to-source voltage) of the control end and second end (e.g., source) is lower than the threshold voltage of transistor, such that the transistor operates in a cutoff area or a so-called subthreshold area. Under this operating condition, different light intensity and input signal size will affect leakage current (or called subthreshold leakage) of the transistor.

Figure 1B:
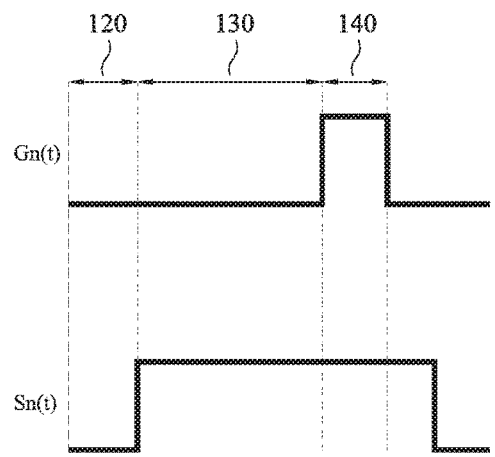
FIG. 1B is a working waveform diagram of the optical sensing circuit, in accordance with some embodiments of the present disclosure.

Referring to FIG. 1B, FIG. 1B is a working waveform diagram of the optical sensing circuit 100 of FIG. 1A in accordance with some embodiments of the present disclosure.

The operation process of the optical sensing circuit 100 includes the initialization period 120, the sensing period 130, and a sampling period 140. During the initialization period 120, the sampling signal $G_n(t)$ and the sensing signal $S_n(t)$ both have a disable level (e.g., low voltage). In response to the above signal, the transistor TSW is turned off, and the capacitor C1 starts to discharge to generate the second current I2, to lower the voltage $V_A$ of the second node N2. The second current I2 flows from the second N2 through the third optical sensing element Tp1 and the second optical sensing element Tp2 sequentially, and at last flows to the terminal for receiving the sensing signal $S_n(t)$.

During the sensing period 130, the sampling signal $G_n(t)$ is still at the disable level and the sensing signal $S_n(t)$ is transitioned to an enable level (e.g., high voltage). In response to the above signal, the transistor TSW is turned off, and the first optical sensing element Tp3 generates the first current I1 according to the sensing signal $S_n(t)$ and the first color light. The first current I1 flows through the third optical sensing element Tp1 and charges the capacitor C1, to raise the voltage $V_A$ of the second node N2.

During the sampling period 140, the sampling signal $G_n(t)$ is also transitioned to the enable level. In response to the sampling signal $G_n(t)$, the transistor TSW is turned on to output the voltage $V_A$ of the second node N2 as the detection signal SS for the sensing line 110. During the sensing period 130, if the intensity of the first color light increases, the first current I1 is larger, and the voltage VA is higher; on the contrary, if the intensity of the first color light is decreases, the first current I1 is smaller, and the voltage VA is lower. Therefore, during the sampling period 140, the detection signal SS on the sensing line 110 can reflect whether the optical sensing circuit 100 receives the first color light.

In some embodiments, the sampling circuit 102 is configured to output the detection signal SS for the sensing line 110 based on the voltage $V_A$ of the second node N2. In FIG. 1A, the transistor TSW is used as an example of implementing the sampling circuit 102, and the sampling circuit 102 can also be other types of circuits for performing continuous or discrete sampling for the sensing voltage $V_A$.

In various embodiments, related configurations of the first color light to the third color light can be changed according to actual application and thus color allocation of the first color light to the third color light is not limited to red, blue and green. Corresponding to color allocation of the first color light to the third color light, the implementation of the first filter element CF1 to the third filter element CF3 will be adjusted accordingly.

Figure 2:
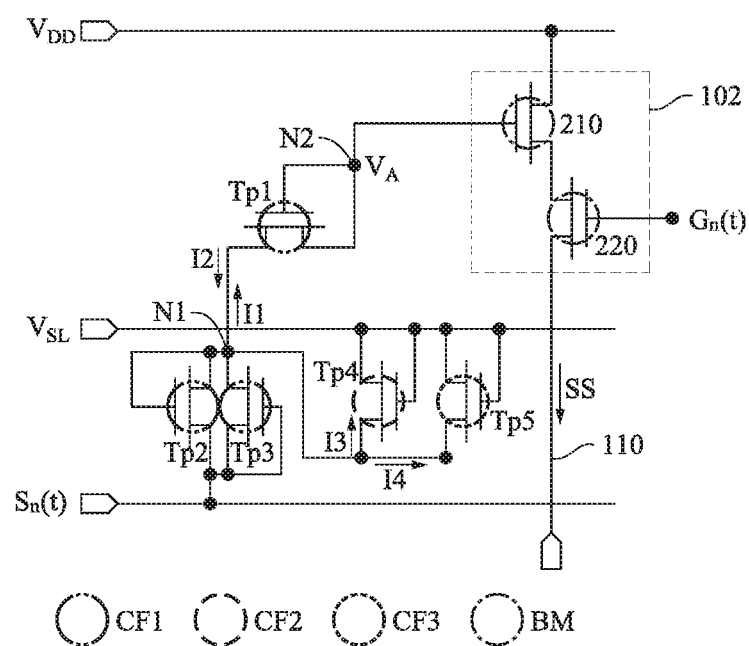
FIG. 2 is a schematic diagram of the optical sensing circuit, in accordance with others embodiments of the present disclosure.

Referring to FIG. 2, FIG. 2 is a schematic diagram of the optical sensing circuit 100 illustrated in accordance with some other embodiments of the present disclosure. For ease of understanding, similar elements in FIG. 1 and FIG. 2A are designated with the same reference numbers.

In this embodiment, the sampling circuit 102 includes a transistor 210 and a transistor 220, and both can be implemented by active pixel sensor (APS). One end of the transistor 210 is configured to receive a voltage $V_{DD}$, and the other end of the transistor 210 is coupled to the second node N2 and is turned on according to the voltage $V_A$ of the second node N2. The transistor 220 is coupled to the transistor 210 and configured to be turned on according to the sampling signal $G_n(t)$, to output the detection signal SS based on the voltage $V_{DD}$.

In some embodiments, the capacitor C1 in FIG. 1A can be implemented by a parasitic capacitance in real circuitry. In the example in FIG. 2A, the second node N2 is coupled to a parasitic capacitance (not shown) and configured to be charged by the first current I1 to provide the voltage $V_A$.

Similar to FIG. 1B, the operation process of the optical sensing circuit 100 in FIG. 2 also includes the initialization period 120, the sensing period 130, and the sampling period 140. The operations of the initialization period 120 and the sensing period 130 can be referred to the above illustration in FIG. 1B and thus they are not further detailed herein. During the sampling period 140, the sampling signal $G_n(t)$ is transitioned to the enable level. In response to the sampling signal $G_n(t)$, the transistor 220 is turned on. If the voltage $V_A$ is raised to a sufficiently high level during the sensing period 130, the transistor 210 is turned on. Accordingly, the voltage $V_{DD}$ can be output as the detection signal SS through the transistor 210 and the transistor 220, and transmitted to the sensing line 110.

Figure 3A:
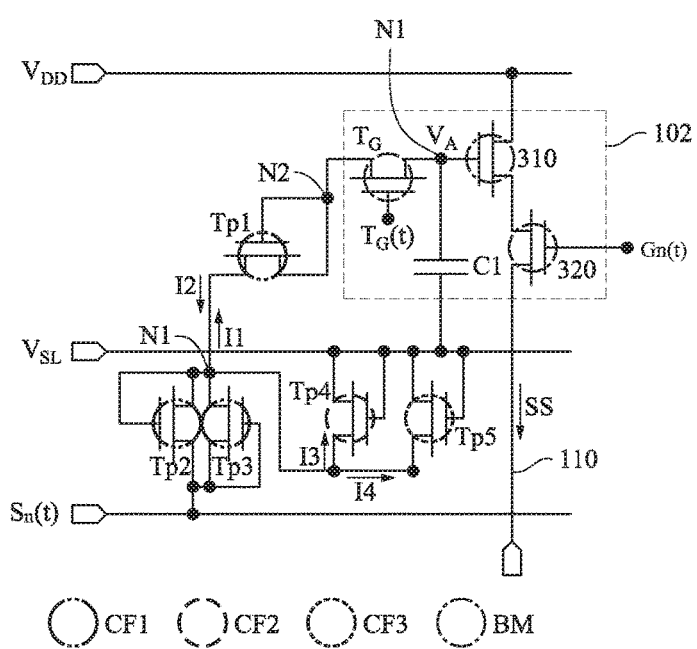
FIG. 3A is a schematic diagram of the optical sensing circuit, in accordance with others embodiments of the present disclosure.

Referring to FIG. 3A, FIG. 3A is a schematic diagram of the optical sensing circuit 100 illustrated in accordance with some other embodiments. For ease of understanding, similar elements in FIG. 1 and FIG. 3A are designated with the same reference numbers.

In this embodiment, the sampling circuit 102 includes a transistor $T_G$, the capacitor C1, the transistor 210, a transistor 320, in which the above transistors can be implemented by APS. The transistor $T_G$ is coupled to the second node N2 and configured to be turned on according to a transmission signal $T_G(t)$, to transmit the first current I1. One end of the capacitor C1 is coupled to the transistor $T_G$ to receive the first current I1 from the transistor $T_G$, and the other end of the capacitor C1 is configured to receive the voltage $V_{SL}$. One end of a transistor 310 receives the voltage $V_{DD}$ and the other end of the transistor 310 is coupled to the capacitor C1. The transistor 310 is turned on according to the voltage of the capacitor C1. The transistor 320 is coupled to the transistor 320 and configured to be turned on according to the sampling signal $G_n(t)$ and output the detection signal SS to the sensing line 110 based on the voltage $V_{DD}$.

Figure 3B:
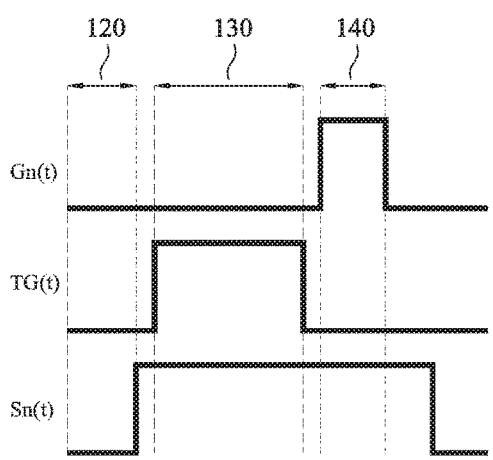
FIG. 3B a working waveform diagram of the optical sensing circuit of FIG. 3A, in accordance with others embodiments of the present disclosure.

Referring to FIG. 3B, FIG. 3B is a working waveform diagram of the optical sensing circuit 100 in FIG. 3A in accordance with some other embodiments.

Similar to FIG. 1B, the operating process of the optical sensing circuit 100 includes the initialization period 120, the sensing period 130, and the sampling period 140. During the initialization period 120, the sampling signal $G_n(t)$, the transmission signal $T_G(t)$, and the sensing signal $S_n(t)$ all have the disable level. In response to these signals, the transistor 320 and the transistor $T_G$ are turned off. Under these conditions, the capacitor C1 generates the second current I2 (i.e., discharging) to lower the voltage $V_A$ of the second node N2. The second current I2 flows from the second node N2 through the transistor $T_G$, the third optical sensing element Tp1, and the second optical sensing element Tp2 sequentially, and flows to the terminal for receiving the sensing signal $S_n(t)$.

During the sensing period 130, the sampling signal $G_n(t)$ still has the disable level, and the sensing signal $S_n(t)$ and the transmission signal $T_G(t)$ are transitioned to the enable level. In response to the above signals, at this time the first optical sensing element Tp3 generates the first current I1 according to the first color light, and the transistor $T_G$ is turned on. The first current I1 flows through the third optical sensing element Tp1 and is transmitted to the capacitor C1 through the transistor $T_G$. As a result, the capacitor C1 can be charged by the first current I1 to raise the voltage $V_A$ of the second node N2.

During the sampling period 140, the sampling signal $G_n(t)$ is transitioned to the enable level, the transmission signal $T_G(t)$ is transitioned to the disable level, and the sensing signal still has the enable level. In response to the above signals, the transistor 320 is turned on, and the transistor $T_G$ is turned off. If the voltage $V_A$ has a sufficiently high level during the sensing period 130, the transistor 310 is turned on. Accordingly, the voltage $V_{DD}$ can be output as the detection signal SS through the transistor 310, and transistor 320, and transmitted to the sensing line 110.

In some embodiments in FIG. 2A or FIG. 3A, because the operation of APS is mainly for current drive, the current signal on the sampling circuit 102 is more intense and less vulnerable to thermal noise interference. Furthermore, the transistor $T_G$ can separate internal diode (not shown) in APS and reduce thermal noise interference. In some embodiments, the transistor $T_G$ can be further configured to have correlated double sampling operation, in order to further raise accuracy of the detection signal SS.

Figure 4:
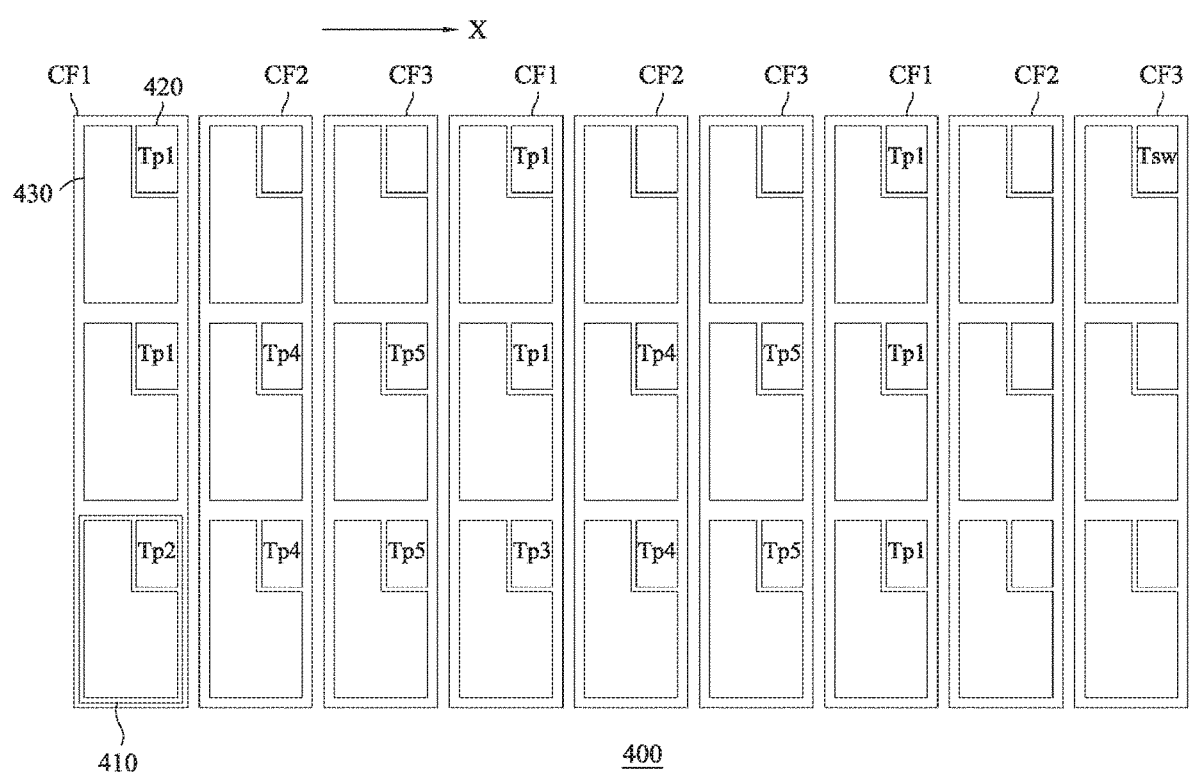
FIG. 4 is a display panel diagram, in accordance with some embodiments of the present disclosure.

Referring to FIG. 4, FIG. 4 is a schematic diagram of the display panel 400 illustrated in accordance with some embodiments of the present disclosure. For ease of understanding, reference is also made to the above FIG. 1A-FIG. 3B. Similar elements in FIG. 4 and the above figures are designated with the same reference numbers.

In some embodiments, the display panel 400 includes pixel circuits 410, in which each pixel circuit 410 further includes a sensing area 420 and a display area 430.

In some embodiments, the aforementioned optical sensing circuit 100 is disposed above the sensing area 420 and configured to sense the external ambient light. The display circuit is disposed above the display area 430 and configured to display an image.

In some embodiments, the pixel circuits 410 in the display panel 400 are arranged in array. The pixel circuits 410 in each column are all covered by a corresponding filter element. For example, along a direction X, the first filter element CF1, the second filter element CF2, and the third filter element CF3 are arranged in order repeatedly.

In some embodiments, each optical sensing element in the optical sensing circuit 100 can be implemented by multiple transistors coupled in parallel, and the above multiple transistors can be configured in the pixel circuits 410 respectively and coupled in parallel to each other through interconnection lines (not shown), to equivalently form the optical sensing circuit 100 as discussed above.

In a non-limiting embodiment, the optical sensing elements in the optical sensing circuit 100 are separately disposed in a 9×3 (i.e., 9 columns and 3 rows) layout design. As shown in FIG. 4, the third optical sensing element Tp1 can be implemented by 6-7 transistors which are separately disposed in the multiple pixel circuits 410. Each one of the second optical sensing element Tp2 and the first optical sensing element Tp3 can be implemented by one transistor. Each one of the fourth optical sensing element Tp4 and the fifth optical sensing element Tp5 can be implemented by four transistors. In other words, in this embodiment, the ratio of the number (e.g., approximately 6-7) of transistors implementing the third optical sensing elements Tp1 to the number (e.g., approximately 1) of one or more transistors implementing the second optical sensing element or the first optical sensing element Tp3 is greater than 1.

The above values of the numbers of transistors implementing each optical sensing element are given only for illustrative purposes. The present disclosure is not limited thereto.

In related technologies, the optical sensing circuit 100 uses only a single optical sensing element (e.g., only using the second optical sensing element Tp2) to sense the first color light. In these technologies, in order to increase detection sensitivity of the first color light, the single optical sensing element requires a larger size to have a wider channel width. As a result, the aperture ratio of the display area would decrease. Compared to the above technologies, some embodiments of the present disclosure are provided to be able to increase the detection sensitivity of the first color light by disposing the first optical sensing element Tp3. Furthermore, compared to the above related technologies, in the embodiments of the present disclosure, the number of transistors for implementing the first optical sensing element Tp3 and the second optical sensing element Tp2 can be less. In other words, compared to the optical sensing circuit of the above technologies, the present disclosure can be used to save circuit space, and the saved circuit space can be configured for the third optical sensing element Tp3 to be disposed, to arrange the third optical sensing elements Tp1 in sensing areas 420 of more pixel circuits 410. As a result, the sensing area 420 of each pixel circuit 410 can shrink, and the aperture ratio of the display area 430 can increase.

In some embodiments, the first optical sensing element Tp3 and the second optical sensing element Tp2 in FIG. 1A, FIG. 2, and FIG. 3A can be not covered by the first filter element CF1. In these examples, the first optical sensing element Tp3 and the second optical sensing element Tp2 generate the aforementioned first current I1 and the second current I2 in response to the ambient light. By this configuration, the voltage $V_A$ is related to one color ratio of the ambient light. For example, by a measuring operation in advance, it can be known that when the ratio of the red light to the ambient light is higher (i.e., the intensity of the red light is higher), the maximum value of the voltage $V_A$ in multiple measurements is approximately 8.4-8.6 volt (V). As a result, the optical sensing circuit 100 can further operate with a processing circuit configured for performing corresponding algorithm, to determine a color ratio of the present ambient light according to multiple voltage values of the detection signal SS.

The above is only exemplarily explained with red light, and related determinations for other color lights can be deduced by analogy. The above voltage range is only provided for example, and thus the present disclosure is not limited to the above values.

Figure 5:
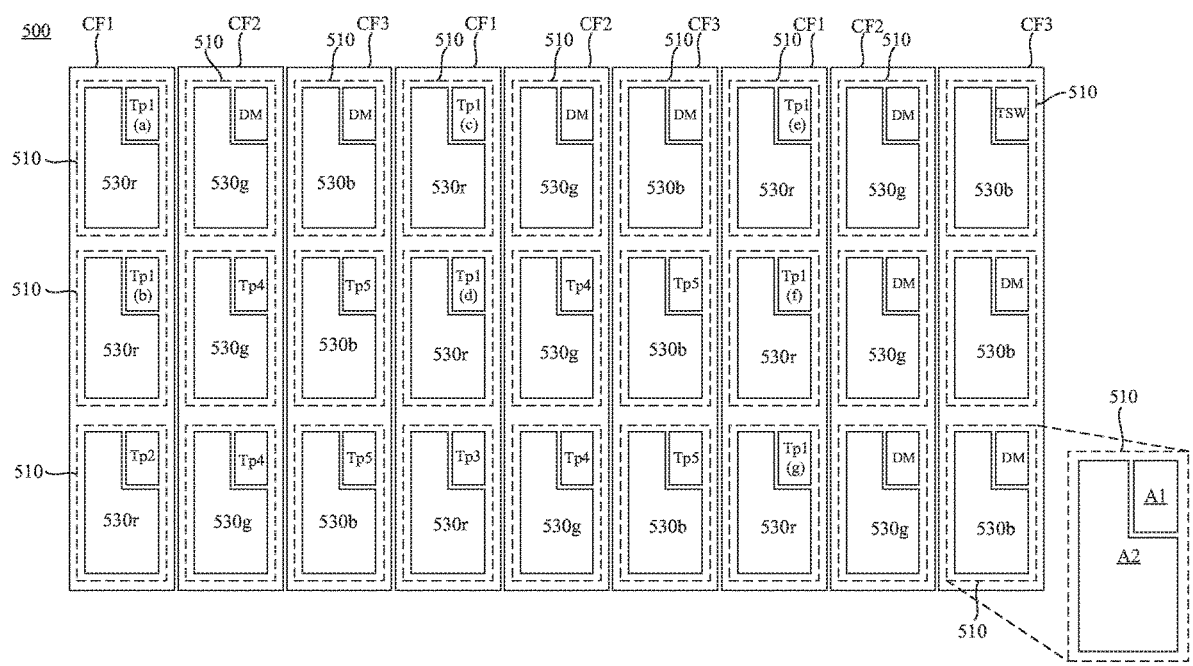
FIG. 5 is a schematic diagram of a display sensing panel 500, illustrated in accordance with some embodiments of the present disclosure.

Referring to FIG. 5, FIG. 5 is a schematic diagram of a display sensing panel 500 illustrated in accordance with some embodiments of the present disclosure. For ease of understanding, reference is made to the above FIG. 1A-FIG. 1B, and the similar elements in FIG. 5 and the above figures are designated with the same reference numbers.

As shown in FIG. 5, the display sensing panel 500 includes display sensing units 510. These display sensing units 510 are arranged in matrix on different positions of the display sensing panel 500, a matrix composed of the 9×3 (a total number of 27) display sensing units 510 is illustrated in FIG. 5, and in the actual applications, more display sensing units 510 can be configured according to the required resolutions and sizes of the display sensing panel 500. Since more display sensing units 510 can have similar architectures, 9×3 display sensing units 510 are exemplarily illustrated in the present disclosure.

Each of the display sensing units 510 includes a sensing area A1 and a sensing area A2. The display sensing panel 500 includes display electrodes. In FIG. 5, the display sensing panel 500 includes nine display electrodes 530r, nine display electrodes 530g, and nine display electrodes 530b. The above 27 display electrodes 530r, 530g, and 530b are disposed separately in the display areas A2 of the display sensing units 510. The display electrodes 530r, 530g, and 530b are configured to display images with different gray levels according to levels of the inputted display signals, in which the displayed images of different brightness can be formed by the display electrodes 530r, 530g, and 530b operating with the first filter element CF1, the second filter element CF2, and the third filter element CF3 of different colors.

The display sensing panel 500 includes at least one optical sensing circuit. A group of optical sensing circuits are illustrated in FIG. 5, and the circuit architectures of the optical sensing circuits can be referred to the optical sensing circuit 100 in FIG. 1A. In actual applications, when the display sensing panel 500 includes more display sensing units 510 e.g., 1920×1080 display sensing unit 510), more groups of the optical sensing circuits 100 can be disposed correspondingly.

The optical sensing circuit 100 is disposed in the sensing area A1 of each one of the above 27 display sensing units 510.

Referring to the embodiments of FIG. 1A, each optical sensing circuit 100 includes the first optical sensing element Tp3, the second optical sensing element Tp2, the third optical sensing element Tp1, the fourth optical sensing element, the fifth optical sensing element Tp5, and the sampling circuit 102.

In one embodiment, the optical sensing circuit 100 in FIG. 1A is configured to sense the first color light in the ambient light, and configured to generate the sensing voltage $V_A$ of different levels according to the light intensity of the first color light in the ambient light.

As shown in FIG. 1A, the first optical sensing element Tp3 includes the first switch, the control end of the first switch of the first optical sensing element Tp3 receives the sensing signal $S_n(t)$, the first end of the first switch receives the sensing signal $S_n(t)$, and the second end of the first switch is coupled to the first node N1. The second optical sensing element Tp2 includes the second switch, the control end of the second switch of the second optical sensing element Tp2 is coupled to the first node N1, the first end of the second switch receives the sensing signal $S_n(t)$, and the second end of the second switch is coupled to the first node N1.

In the present embodiment, the sensing voltage $V_A$ is adjusted according to the different first color lights mainly through the third optical sensing element Tp1 coupled between the first node N1 and the second node N2, and the third optical sensing element Tp1 is covered by the first filter element CF1 to receive the first color light. The third optical sensing element Tp1, according to the intensity of the first color light, charges from the first node N1 to the second node N2 or discharges from the second node N2 to the first node N1, to adjust the sensing voltage $V_A$.

As shown in FIG. 1B, during the sensing period 130, the sensing signal $S_n(t)$ is transitioned to the high level, and the sensing signal $S_n(t)$ switches the control end of the first switch of the first optical sensing element Tp3 to the high voltage level to turn on the first switch. After the first switch is turned on, the sensing signal $S_n(t)$ enables the first node N1 to have the high voltage level. At that moment, the first color light in the ambient light will cause the optical sensing leakage current, which is the first current I1 in FIG. 1A, to be generated on the third optical sensing element Tp1. According to the intensity of the first color light, the third optical sensing element Tp1 has various optical sensing leakage current levels that are associated with the first current I1 flowing from the first node N1 to the second node N2, to raise the sensing voltage $V_A$ of the second node N2, when the voltage $V_A$ of the second node N2 have a positive correlation with the light intensity of the first color light.

At the same time, the second color light in the ambient light enables the fourth optical sensing element Tp4 to generate the optical sensing leakage current, which flows from the first node N1 via the fourth optical sensing element Tp4. When the ratio of the second color light in the ambient light increases, the third current I3 flowing through fourth optical element Tp4 will increase. In other words, when the ratio of the second color light in the ambient light is high, the third current I3 flowing through the fourth optical sensing element Tp4 would compete with the first current I1 flowing through the third optical sensing element Tp1 to be shunted, to decrease the charging, by the first current I1, of the voltage $V_A$ of the second node N2. The fourth optical sensing element Tp4 is configured to reflect the ratio of the second color light in the ambient light. When the ratio of the second color light in the ambient light increases, the fourth optical sensing element Tp4 can lower the sensing voltage $V_A$ (which is used to represent the light intensity of the first color light). In other words, the sensing voltage $V_A$ can be reversely compensated according to the light intensity of the second color light.

The third color light in the ambient light also enables the fifth optical sensing element Tp5 to generate the optical sensing leakage current, which flows from the first node N1 via the fifth optical sensing element Tp5. When the ratio of the third color light in the ambient light increases, through a similar manner, the fifth optical sensing element Tp5 can generate the fourth current I4, to lower the sensing voltage $V_A$ (which is used to represent the light intensity of the first color light). In other words, the sensing voltage $V_A$ can be reversely compensated according to the light intensity of the third color light.

When the sensing period 130 ends, the sensing signal $S_n(t)$ is transitioned back to the low voltage level. At the moment, if the sensing voltage $V_A$ stored in the capacitor is at the high level, the switch in the third optical sensing element Tp1 is turned on, such that the voltage on the first node N1 is equal to the sensing voltage $V_A$, and at the same time, the voltage of the first node N1 is configured for controlling the control end of the second switch of the second optical sensing element Tp2, such that the second switch of the second optical sensing element Tp2 is also turned on. At the moment, the second current can be formed to flow from the second node N2 through the turn-on third optical sensing element Tp1 and the turn-on second optical sensing element Tp2, back to the terminal of the sensing signal $S_n(t)$ of the low voltage level, to reset the voltage of the second node N2.

It should be noted that, in a hypothetical example, the optical sensing circuit 100 has no first optical sensing element Tp3. In other words, in the condition that the optical sensing circuit 100 has the second optical sensing element Tp2, the third optical sensing element Tp1, the fourth optical sensing element Tp4, the fifth optical sensing element Tp5, and the sampling circuit 102, the first current I1 configured for sensing the first color light, and the third current I3 and the fourth current i4 configured for reversely compensating the second color light and the third color light are required to be provided by the second optical sensing element Tp2.

At the moment, in the above hypothetical example, when the ambient light illuminates, the second optical sensing element Tp2 actually generates the optical sensing leakage current because of the first color light in the ambient light. But for enabling the optical sensing leakage current of the second optical sensing element Tp2 to satisfy the sum of the first current I1, the third current I3, and the fourth current I4, the second optical sensing element Tp2 requires a significant large channel width, such that such a significant optical sensing leakage current can be generated.

In the embodiments of FIG. 5, there are 27 sensing areas A1 in total, in which 9 sensing areas A1 correspond to the first color light, other 9 sensing areas correspond to the second color light, and yet another 9 sensing areas A1 correspond to the third color light.

In the above hypothetical example, the 9 sensing areas corresponding to the first color light require a larger space for the second optical sensing element Tp2 to be disposed. For example, the space for 5 sensing areas A1 is configured for the second optical sensing element Tp2 to be disposed, and only the space for 4 sensing areas A1 space is left for the third optical sensing element Tp1 to be disposed, otherwise the optical sensing leakage current on the second optical sensing element Tp2 is not sufficient to provide the first current I1 configured to sense the first color light, and to provide the third current I3 and the fourth current I4 configured for reverse compensations of the second color light and the third color light. In this situation, since the space for only the 4 sensing areas A1 is configured for the third optical sensing element Tp1 to be disposed, each sensing area A1 requires a switch element with a larger channel width. In the display sensing unit 510, the sensing area A1 would require to occupy a larger space, which would crowd out the space for the display area A2, such that the aperture ratio of the display area A2 decreases.

In the embodiments in FIG. 1A and FIG. 5, since the first optical sensing element Tp3 is configured, during the sensing period 130, the sensing signal $S_n(t)$ enables the control end of the first switch of the first optical sensing element Tp3 to have the high voltage level, to turn on the first switch. As a result, the first switch of the first optical sensing element Tp3 is not powered by the optical sensing leakage current but directly conducts the sensing signal $S_n(t)$ with the first node N1 instead. An upper limit of the current that is allowed to flow through the first switch of the first optical sensing element Tp3 in the turn-on state is greater than, on the order of magnitude, the charging current I1 for charging the second node N2, which is generated by the third optical sensing element Tp1 according to the first color light. As a result, the first optical sensing element Tp3 of wider channel width is not required. In this embodiment, as shown in FIG. 5, only one sensing area A1 in the 9 sensing areas A1 corresponding to the first color light is required for the first optical sensing element Tp3 to be disposed, and only one sensing area A1 in the 9 sensing areas A1 is required for the second optical sensing element Tp2 to be disposed, and other 7 sensing areas A1 can be configured for 7 third switches Tp1(a)-Tp1(g) of the third optical sensing element Tp1 to be disposed, in which each one of the 7 third switches Tp1(a)-Tp1(g) is configured in one of the sensing areas A1 of the display sensing units 510.

In this embodiment, the 7 sensing areas of the 9 sensing areas corresponding to the first color light, in the display sensing units 510, are configured for the third switches Tp1(a)-Tp1(g) of the third optical sensing element Tp1 to be disposed. Correspondingly, one sensing area among the 9 sensing areas is configured for the first switch of the first optical sensing element Tp3 to be disposed, and one sensing area among the 9 sensing areas is configured for the second switch of the second optical sensing element Tp2 to be disposed.

Since the 7 sensing areas among the 9 sensing areas corresponding to the first color light are configured for the third switches Tp1(a)-Tp1(g) of the third optical sensing element Tp1 to be disposed, for generating the first current I1 with similar sensing effect for the first color light, a total channel width of the 7 third switches Tp1(a)-Tp1(g) of the 7 sensing areas in this embodiment only requires the similar 4 switches in the 4 sensing areas A1 in the above hypothetical example. As a result, 7 third switches Tp1(a)-Tp1(g) can be fabricated with a relatively narrower channel width, and thus it is not required to occupy the larger sensing area A1. In this situation, a space ratio of the display area A2 to the display sensing unit 510 can be increased, such that the aperture ratio of the display area A2 increases.

The present disclosure is not limited to the above embodiments of the switch numbers of the third optical sensing element Tp1, the first optical sensing element Tp3, and the second optical sensing element Tp2 being 7, 1, 1, respectively. In actual applications, the switch numbers of the third optical sensing element Tp1, the first optical sensing element Tp3, and the second optical sensing element Tp2 can be X, Y, Z, respectively, where X, Y, Z are all positive integers, and X>Y, and X>Z.

In this embodiment, a channel width of first switch of the first optical sensing element Tp3 is smaller than a total channel width of the third switches Tp1(a)-Tp1(g) of the third optical sensing element Tp1.

Furthermore, a ratio of the channel width to the channel length of the first switch in the first optical sensing element Tp3 will affect the charging variations of the sensing voltage $V_A$. For example, when the channel width of the first switch in the first optical sensing element Tp3 is wider and the channel length is shorter, with the illumination of the first color light, the charging of the sensing voltage $V_A$ is faster and the variation of the sensing voltage $V_A$ is greater. On the contrary, when the channel with of the first switch in the first optical sensing element Tp3 is narrower and the channel length is longer, with the illumination of the first color light, the charging of the sensing voltage $V_A$ is slower and the variation of the sensing voltage $V_A$ is smaller.

In some embodiments, the ratio of the channel width to the channel length of the first switch in the first optical sensing element Tp3 can be adjusted to a ratio of a longer channel width and a short channel length, so as to reduce the charging response of the sensing voltage $V_A$ corresponding to the illumination of the first color light. As a result, the optical sensing circuit 100 and the display sensing panel 500 can bear higher illumination of the ambient light.

Based on the above, the optical sensing circuit and the display panel provided in the embodiments of the present disclosure can be used to reduce the interference of the ambient light, to reduce chances of the optical sensing circuit being triggered mistakenly, and to be able to increase the aperture ratio of the display area.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical sensing circuit, comprising:
  a first optical sensing element configured to provide a first current from a first node to a second node in response to an ambient light and a sensing signal during a sensing period, to raise a voltage of the second node;
  a second optical sensing element coupled in parallel to the first optical sensing element and configured to draw a second current from the second node to the first node in response to the ambient light and the sensing signal during an initialization period, to lower the voltage of the second node;
  a third optical sensing element coupled between the first node and the second node, wherein the third optical sensing element is covered by a first filter element to receive a first color light and is configured, according to the first color light, to transmit the first current to the second node or transmit the second current to the first node; and
  a sampling circuit configured to be turned on according to a sampling signal to output a detection signal based on the voltage of the second node.

2. The optical sensing circuit of claim 1, further comprising:
  a capacitor, wherein a first end of the capacitor is coupled to the second node and a second end of the capacitor is configured to receive a voltage.

3. The optical sensing circuit of claim 1, wherein the first optical sensing element and the second optical sensing element are covered by the first filter element to receive the first color light, the first optical sensing element is configured to generate the first current according to the first color light and the sensing signal, and the second optical sensing element is configured to generate the second current according to the first color light and the sensing signal.

4. The optical sensing circuit of claim 3, further comprising:
  a fourth optical sensing element, wherein one end of the fourth optical sensing element is coupled to the first node, the other end of the fourth optical sensing element is configured to receive a voltage, and the fourth optical sensing element is covered by a second filter element to receive a second color light and lower the voltage of the second node according to the second color light; and
  a fifth optical sensing element, wherein one end of the fifth optical sensing element is coupled to the first node, the other end of the fifth photosensitive element is configured to receive the voltage, and the fifth optical sensing element is covered by a third filter element to receive a third color light and lower the voltage of second node according to the third color light.

5. The optical sensing circuit of claim 1, wherein the sampling circuit comprises:
  a transistor configured to be turned on according to the sampling signal to output the detection signal based on the voltage of the second node.

6. The optical sensing circuit of claim 1, wherein the sampling circuit comprises:
  a first transistor configured to be turned on according to the voltage of the second node, wherein one end of the first transistor is configured to receive a voltage and the other end of the first transistor is coupled to the second node; and
  a second transistor coupled to the first transistor and configured to be turned on according to the sampling signal to output the voltage as the detection signal.

7. The optical sensing circuit of claim 1, wherein the sampling circuit comprises:
  a first transistor coupled to the second node and configured to be turned on according to a transmission signal to transmit the first current;
  a capacitor, wherein one end of the capacitor is coupled to the first transistor to receive the first current and the other end of the capacitor is configured to receive a first voltage;
  a third transistor configured to be turned on according to the voltage of the capacitor, wherein one end of the third transistor is coupled to the capacitor and the other end of the third transistor is configured to receive a second voltage; and
  a fourth transistor coupled to the third transistor and configured to be turned on according to the sampling signal to output the voltage as the detection signal.

8. The optical sensing circuit of claim 1, wherein the voltage of the second node is related to a color ratio of the ambient light.

9. A display panel, comprising:
  a pixel array, wherein a pixel in the pixel array comprises a optical sensing circuit and the optical sensing circuit comprises:
  a plurality of first optical sensing elements, wherein the plurality of first optical sensing elements are connected in parallel with each other and configured to provide a first current or a second current according to an ambient light and a sensing signal, and a direction of the first current is opposite to the direction of the second current; and
  a second optical sensing element configured to receive the first current or transmit the second current according to a first color light, wherein each of the plurality of first optical sensing elements is implemented by at least one first transistor, the second optical sensing element is implemented by a plurality of second transistors, and a ratio of a number of the plurality of second transistors to the number of at least one first transistor is greater than one.

10. The display panel of claim 9, wherein the plurality of first optical sensing elements and the second optical sensing element are covered by a filter element to receive a same color light.

11. A display sensing panel, comprising:
  a plurality of display sensing units, wherein each of the plurality of display sensing units comprises a display area and a sensing area;
  a plurality of display electrodes disposed in the plurality of display areas of the plurality of display sensing units;

at least one optical sensing circuit disposed in the plurality of sensing areas of the plurality of display sensing units, wherein each of the at least one optical sensing circuit comprises:

a first switch, wherein a control end of the first switch is configured to receive a sensing signal, a first end of the first switch is configured to receive the sensing signal, and a second end of the first switch is coupled to a first node;

a second switch, wherein a control end of the second switch is coupled to the first node, a first end of the second switch is configured to receive the sensing signal, and a second end of the second switch is coupled to the first node;

a third optical sensing element coupled between the first node and the second node, wherein a control end of the second switch is coupled to the second node, a first end of the second switch is coupled to the first node, a second end of one of the second switches is coupled to the second node, the third optical sensing element is covered by a first filter element to receive a first color light, and the third optical sensing element is configured, according to the first color light, to charge the second node from the first node or to discharge the first node from the second node.

12. The display sensing panel of claim 11, wherein each of the at least one optical sensing circuit comprises:

a capacitor, wherein a first end of the capacitor is coupled to the second node, the capacitor is configured to store a voltage at the second node, and the voltage at the second node has a positive correlation with a light intensity of the first color light.

13. The display sensing panel of claim 12, wherein the first switch and the second switch are covered by the first filter element.

14. The display sensing panel of claim 13, further comprising:

a fourth optical sensing element, wherein one end of the fourth optical sensing element is coupled to the first node and the fourth optical sensing element is covered by a second filter element, to receive a second color light; and a fifth optical sensing element, wherein one end of the fifth optical sensing element is coupled to the first node and the fifth optical sensing element is covered by a third filter element, to receive a third color light.

15. The display sensing panel of claim 14, wherein the voltage of the second node has a negative correlation with the light intensity of the second color light and the third color light.

16. The display sensing panel of claim 11, further comprising:

a transistor, wherein the transistor is configured to be turned on according to a sampling signal to output a detection signal based on a voltage of the second node.

17. The display sensing panel of claim 11, wherein the sensing signal is set at a high voltage level to turn on the first switch during a sensing period, and an upper limit of a current of a current that is allowed to flow through the first switch in the turn-on state is greater than a charging current for charging the second node, which is generated by the third optical sensing element according to the first color light.

18. The display sensing panel of claim 11, wherein the third optical sensing element comprises a plurality of third switches, each of the third switches is disposed in one of the sensing areas of the display sensing units, X sensing areas among the sensing areas of the display sensing units are configured for the third switches to be disposed, Y sensing areas among the sensing areas of the display sensing units are configured for the first switches to be disposed, X and Y are positive integers, and X>Y.

19. The display sensing panel of claim 18, wherein Z sensing areas among the plurality of sensing areas of the plurality display sensing units are configured for the second switch to be disposed, Z is the positive integer, and X>Z.

20. The display sensing panel of claim 18, wherein a channel width of the first switch is smaller than a total channel width of the plurality of third switches.

* * * * *